Aug. 2, 1949.                H. L. JOHNSON                 2,478,104
                                FLY TRAP
                          Filed April 26, 1946
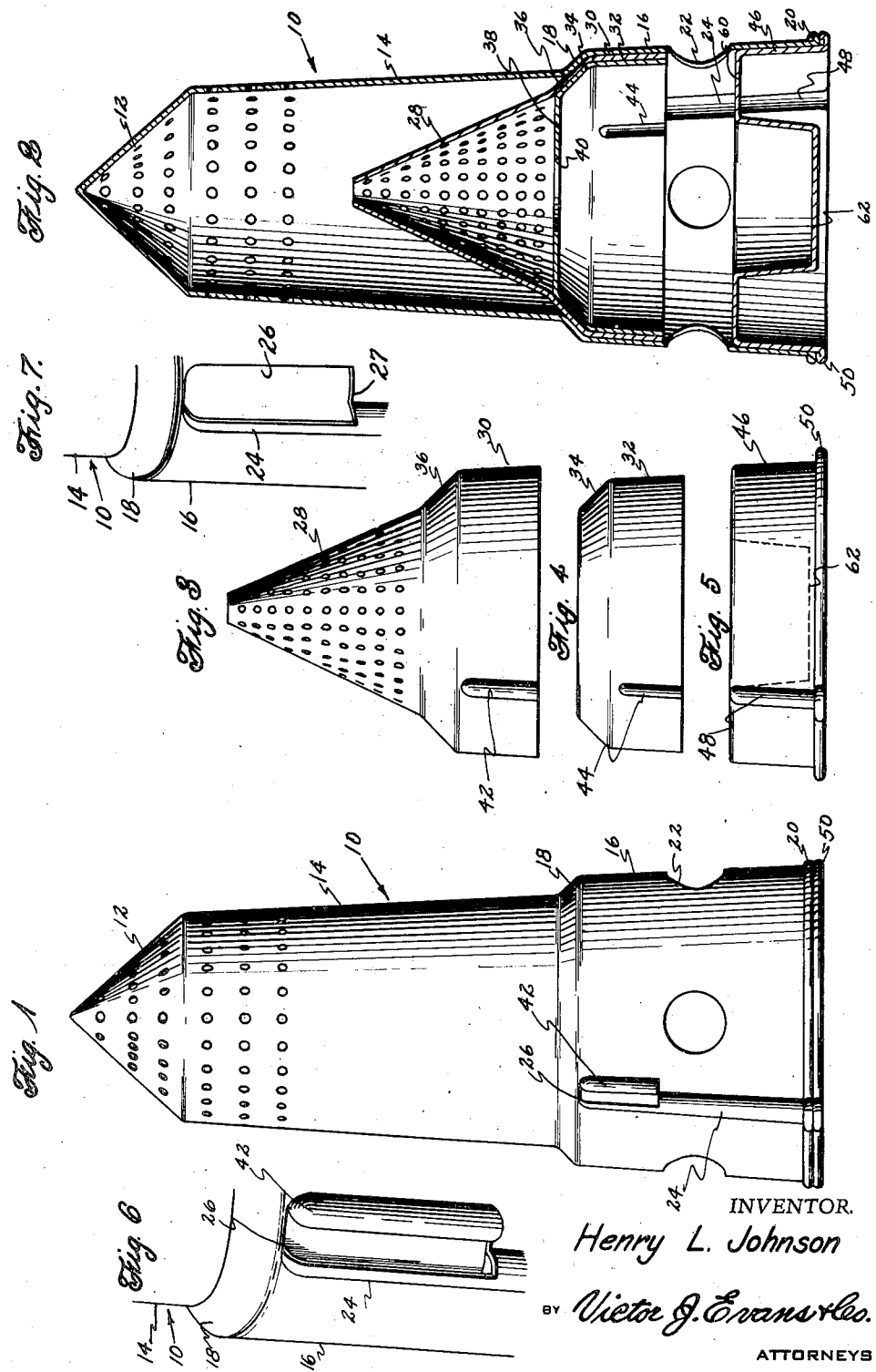
INVENTOR.
Henry L. Johnson
BY Victor J. Evans & Co.
ATTORNEYS Patented Aug. 2, 1949

2,478,104

UNITED STATES PATENT OFFICE 2,478,104

FLYTRAP

Henry L. Johnson, Montevideo, Minn.

Application April 26, 1946, Serial No. 665,078

1 Claim. (Cl. 43—122)

This invention relates to a fly or insect trap.

An object of this invention is to provide a germ proof trap for catching flies and other insects which is separable so that the trap may be dismantled for cleaning.

Another object of this invention is to provide a fly trap which may be baited with some sweet smelling substance to attract the flies into the trap from which they will be unable to escape.

A further object of this invention is to provide a trap that will have an attractive appearance, that is simple in construction, durable in use, efficient in operation and can be manufactured inexpensively.

With the above and other objects and advantages in view the invention consists of the novel details of construction, arrangement and combination of parts, more fully hereinafter described, claimed and illustrated in the accompanying drawing in which:

Figure 1 is an elevational view of an embodiment of the invention.

Figure 2 is a vertical sectional view thereof.

Figure 3 is an elevational view of the inner spout.

Figure 4 is the same of the sealing member.

Figure 5 is the same of the footbowl.

Figure 6 is a fragmentary detailed view of the latching means of the trap; and

Figure 7 is a fragmentary detailed view of the slot for the latching means shown in Figure 6.

Referring more in detail to the drawings, the reference numeral 10 designates the outer casing of the trap which has a perforated conical top 12, a tapered circular body portion 14, the upper section of which is perforated, and a tapered circular base portion 16 of greater diameter than the body portion 14, thus forming the tapered shoulder portion 18. The base portion is provided with a rolled peripheral rim 20 and is provided with insect entrance apertures 22. A vertical rib 24 positioned on the exterior of the base portion has a cut out 26 in the upper end thereof, the purpose of which will be later explained. It will be noted that the cutout 26 extends to the right beyond the rib 24 to provide a shoulder 27 on which the rib 42 of the spout 28 will rest as clearly shown in Figure 6.

When assembling the trap the truncated conical and perforated spout 28 having the enlarged circular base portion 30 conforming to the configuration of the body portion 14 is inserted in the casing 10 and the sealing section 32 having a shoulder 34 adapted to conform to the shoulder 36 of the spout is then positioned in the spout.

The sealing section has a closed top 38 except for the insect entrance opening 40 positioned at the center thereof.

The base portion of the spout is provided with a vertical rib 42 and the rib 44 on the sealing section is adapted to be received therein. These ribs are slidable in the rib 24 of the casing. However, when the spout and sealing section are turned to the right, as viewed in Figure 1, the ribs 42 and 44 thereon emerge from the cutout 26 and lock the spout and sealing section in raised position as shown.

The footbowl 46 having an outer periphery conforming to the base of the casing is then inserted in the casing. A rib 48 on the footbowl conforms with the rib 24 and the rolled rim 50 of the footbowl acts as an abutment for the rolled rim 20 of the casing.

The footbowl is provided with a closed top 60 having the cavity 62 therein for receiving a sweet smelling substance such as sugar or some similar material.

In operation the flies or insects enter through apertures 22 into the casing and passing up through the spout are trapped therein for disposal as desired, the perforations being provided for the admission of air into the casing.

It is believed that the operation and construction of the trap will be apparent to those skilled in the art and it is to be understood that changes may be made in the details of construction, arrangement and combination of parts without departing from the spirit of the invention and the scope of the appended claim.

Having thus described the invention, what is claimed as new and desired to be secured by Letters Patent is.

A device of the character described, comprising an outer conical casing having perforations provided therein adjacent the upper end thereof, a truncated perforated conical spout mounted therein, sealing means mounted in said spout, a footbowl mounted in said casing, said casing having insect entrances therein above said footbowl, a rib on said spout, a rib on said sealing means, said latter rib being of a relative size to the rib on said spout so that the rib on said sealing means can be snugly nested within the rib on said spout, a rib on said casing, said latter rib being of a relative size to the rib on said spout so that the rib on said spout can be snugly nested within the rib on said casing, the rib on said casing having a cut out portion at the top thereof forming a shoulder and adapted to receive the rib on said spout and the rib on said sealing means whereby said spout and said sealing means are retained on the shoulder in raised position within said casing, and a rib on said footbowl adapted to be received in the lower end of the rib on said casing, and said latter ribs adapted to prevent rotation of said casing and said footbowl in respect to each other.

HENRY L. JOHNSON.

REFERENCES CITED

The following references are of record in the file of this patent:

UNITED STATES PATENTS

| Number | Name | Date |
|---|---|---|
| 1,102,642 | Brown | July 7, 1914 |
| 1,487,091 | Day | Mar. 18, 1924 |
| 1,543,968 | Williams et al. | June 30, 1925 |